US010204623B2

(12) United States Patent
Segal et al.

(10) Patent No.: US 10,204,623 B2
(45) Date of Patent: Feb. 12, 2019

(54) PRIVACY CONTROL IN A CONNECTED ENVIRONMENT

(71) Applicant: Essential Products, Inc., Palo Alto, CA (US)

(72) Inventors: Mara Clair Segal, San Francisco, CA (US); Manuel Roman, Sunnyvale, CA (US); Dwipal Desai, Palo Alto, CA (US); Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/587,230

(22) Filed: May 4, 2017

(65) Prior Publication Data

US 2018/0211657 A1    Jul. 26, 2018

Related U.S. Application Data

(60) Provisional application No. 62/448,923, filed on Jan. 20, 2017, provisional application No. 62/486,388, (Continued)

(51) Int. Cl.
| | |
|---|---|
| *G10L 15/00* | (2013.01) |
| *G10L 15/22* | (2006.01) |
| *G10L 15/02* | (2006.01) |
| *G10L 15/08* | (2006.01) |
| *G10L 15/30* | (2013.01) |
| *G10L 25/78* | (2013.01) |

(Continued)

(52) U.S. Cl.
CPC ............ *G10L 15/22* (2013.01); *G10L 15/02* (2013.01); *G10L 15/08* (2013.01); *G10L 15/30* (2013.01); *G10L 25/51* (2013.01); *G10L 25/78* (2013.01); *H04L 63/00* (2013.01); *H04W 12/02* (2013.01); *G10L 2015/088* (2013.01); *G10L 2015/223* (2013.01); *H04L 67/10* (2013.01)

(58) Field of Classification Search
CPC ......... G10L 15/30; G10L 15/34; H04W 12/02
USPC ....................................................... 704/275
See application file for complete search history.

(56) References Cited

U.S. PATENT DOCUMENTS 6,185,535 B1 * 2/2001 Hedin ..................... G10L 15/30
704/270
6,487,534 B1 * 11/2002 Thelen ..................... G10L 15/26
704/270

(Continued)

FOREIGN PATENT DOCUMENTS

KR    20160081811 A    7/2016
WO    2015196063 A1   12/2015

OTHER PUBLICATIONS

U.S. Appl. No. 15/587,244 of Segal, M.C. filed May 4, 2017.

(Continued)

*Primary Examiner* — Daniel Abebe
(74) *Attorney, Agent, or Firm* — Perkins Coie LLP

(57) ABSTRACT

Privacy control in a connected environment is described. An assistant device can detect speech spoken by a user. The speech can include a hardware activation phrase that indicates whether the user intends for at least a portion of the speech to be provided to local resources or cloud resources. The speech can then be provided to the appropriate resource based on the hardware activation phrase.

22 Claims, 7 Drawing Sheets

Related U.S. Application Data filed on Apr. 17, 2017, provisional application No. 62/486,392, filed on Apr. 17, 2017.

(51) Int. Cl.
*G10L 25/51* (2013.01)
*H04W 12/02* (2009.01)
*H04L 29/06* (2006.01)
*H04L 29/08* (2006.01)

(56) References Cited

U.S. PATENT DOCUMENTS

| | | | |
|---|---|---|---|
| 9,070,367 B1* | 6/2015 | Hoffmeister | G10L 15/187 |
| 2009/0299745 A1 | 12/2009 | Kennewick et al. | |
| 2011/0066634 A1* | 3/2011 | Phillips | G10L 15/22 |
| | | | 707/769 |
| 2012/0179471 A1 | 7/2012 | Newman et al. | |
| 2013/0132086 A1* | 5/2013 | Xu | G10L 15/01 |
| | | | 704/257 |
| 2014/0067392 A1 | 3/2014 | Burke | |
| 2014/0098247 A1 | 4/2014 | Rao et al. | |
| 2014/0108019 A1 | 4/2014 | Ehsani et al. | |
| 2014/0207442 A1* | 7/2014 | Ganong, III | H04W 12/02 |
| | | | 704/201 |
| 2014/0279733 A1 | 9/2014 | Djugash et al. | |
| 2014/0280051 A1 | 9/2014 | Djugash | |
| 2015/0067392 A1 | 3/2015 | Lee et al. | |
| 2015/0120288 A1 | 4/2015 | Thomson et al. | |
| 2015/0188949 A1 | 7/2015 | Mahaffey et al. | |
| 2015/0279352 A1 | 10/2015 | Willett | |
| 2015/0279387 A1 | 10/2015 | List | |
| 2015/0331666 A1 | 11/2015 | Busca et al. | |
| 2016/0027440 A1* | 1/2016 | Gelfenbeyn | G10L 15/32 |
| | | | 704/244 |
| 2016/0162469 A1 | 6/2016 | Santos | |
| 2016/0162844 A1 | 6/2016 | Rachuri et al. | |
| 2016/0217788 A1* | 7/2016 | Stonehocker | G10L 15/30 |
| 2016/0260135 A1 | 9/2016 | Zomet et al. | |
| 2016/0279352 A1 | 9/2016 | Yuan et al. | |
| 2016/0379626 A1 | 12/2016 | Stemmer et al. | |
| 2017/0280235 A1 | 9/2017 | Varerkar | |

OTHER PUBLICATIONS

International Search Report and Written Opinion dated Aug. 11, 2017 for International Application Number, 16 pages.

Non-Final Office Action dated Aug. 11, 2017 for U.S. Appl. No. 15/587,244 of M. Segal et al., filed May 4, 2017.

Vacher, Michel et al., "Speech and Speaker Recognition for Home Automation: Preliminary Results", 8th International Conference Speech Technology and Human-Computer Dialogue "SpeD 2015" IEEE Proceedings of the 8th International Conference Speech and Technology and Human-Computer Dialogue, Oct. 2015, 181-190.

International Search Report and Written Opinion dated Aug. 25, 2017 for International Application No. PCT/US2017/35546, 8 pages.

First Office Action with Search Report dated Apr. 13, 2018 for Taiwanese Patent Application No. TW106119218, 15 pages.

Office Action in Austrian Patent Application No. A 9002/2017, dated May 16, 2018, 6 pages.

Office Action dated May 4, 2018 in Austrian Patent Application No. GM9002/2017, 6 pages.

Final Office Action dated May 2, 2018 for U.S. Appl. No. 15/587,244 of M. Segal et al., filed May 4, 2017.

* cited by examiner

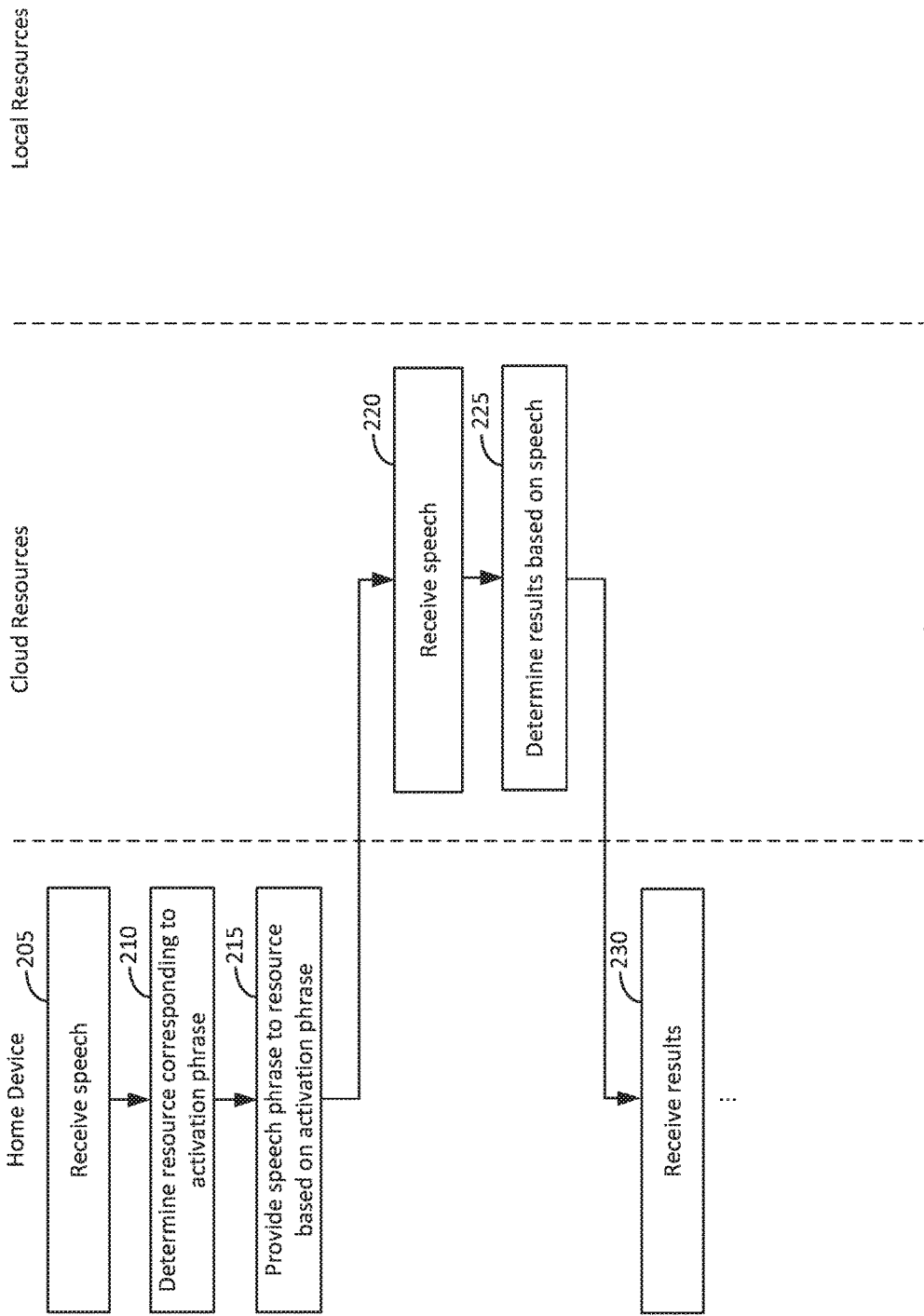

PRIVACY CONTROL IN A CONNECTED ENVIRONMENT

CLAIM FOR PRIORITY

This application claims priority to U.S. Provisional Patent Application No. 62/448,923, entitled "Privacy Control in a Connected Environment," by Segal et al., and filed on Jan. 20, 2017. This application also claims priority to U.S. Provisional Patent Application No. 62/486,388, entitled "Privacy Control in a Connected Environment," by Segal, and filed on Apr. 17, 2017. This application also claims priority to U.S. Provisional Patent Application No. 62/486,392, entitled "Privacy Control in a Connected Environment Based on Speech Characteristics," by Segal, and filed on Apr. 17, 2017. The content of the above-identified applications are incorporated herein by reference in their entirety.

TECHNICAL FIELD

This disclosure relates to privacy control, and in particular privacy control in a connected environment such as a home.

BACKGROUND

The Internet of Things (IoT) allows for the internetworking of devices to exchange data among themselves to enable sophisticated functionality. For example, devices configured for home automation can exchange data to allow for the control and automation of lighting, air conditioning systems, security, etc. In the smart home environment, this can also include home assistant devices providing an intelligent personal assistant to respond to speech. For example, a home assistant device can include a microphone array to receive voice input and provide the corresponding voice data to a server for analysis to provide an answer to a question asked by a user. The server can provide the answer to the home assistant, which can provide the answer as voice output using a speaker. As such, the user and the home assistant device can interact with each other using voice, and the interaction can be supplemented by a server outside of the home providing the answers. However, some users might have privacy concerns with sending voice data to a server outside of the home.

SUMMARY

Some of the subject matter described herein includes a home assistant device, including: a microphone; a speaker; one or more processors; and memory storing instructions, wherein the processor is configured to execute the instructions such that the processor and memory are configured to: detect first speech including a first question spoken by a user of the home assistant device using the microphone; determine that the first speech includes a first hardware activation phrase preceding the first question, wherein the first hardware activation phrase indicates an intention of the user to provide the first question of the first speech to a cloud server; provide the first question to the cloud server; receive a first response from the cloud server providing a first answer to the first question; play back the first answer using the speaker; detect second speech including a second question spoken by the user of the home assistant device using the microphone; determine that the second speech includes a second hardware activation phrase preceding the second question, the first hardware activation phrase and the second hardware activation phrase being different phrases, wherein the second hardware activation phrase indicates an intention of the user to provide the second question of the second speech to local resources of the home assistant device rather than the cloud server due to increased privacy expectations regarding content of the second question in comparison with privacy expectations regarding content of the first question; provide the second question to the local resources of the home assistant device; receive a second response from the local resources providing a second answer to the second question; and play back the second answer using the speaker.

In some implementations, the local resources include one or both of hardware resources of the home assistant device or resources of other devices communicatively coupled with the home assistant device on a wireless network.

Some of the subject matter described herein also includes a method for privacy control in a connected environment including: detecting speech spoken by a user of an assistant device; determining, by a processor, that the speech includes a hardware activation phrase corresponding to an intention of the user to provide at least a portion of the speech to one or both of local resources of the assistant device or a cloud server based on the hardware activation phrase; and providing the portion of the speech to one or both of the local resources or the cloud server based on the hardware activation phrase.

In some implementations, the local resources include one or both of hardware resources of the assistant device or resources of other devices connected with the assistant device on a wireless network.

In some implementations, the method includes determining that the portion of the speech includes a first portion and a second portion, the first portion provided to the local resources, the second portion provided to the cloud server.

In some implementations, the method includes receiving first response data corresponding to the first portion from the local resources; receiving second response data corresponding to the second portion from the cloud server; and providing a response to the portion of the speech based on the first response data received from the local resources and the second response data received from the cloud resources.

In some implementations, the first portion and the second portion are determined based on content of the portion of the speech.

In some implementations, a first hardware activation phrase corresponds to providing the portion of the speech to the local resources, and a second hardware activation phrase corresponds to providing the portion of the speech to the cloud server, the first hardware activation phrase and the second hardware activation phrase being different.

In some implementations, the portion of the speech is subsequent to a portion of the speech corresponding to the hardware activation phrase.

Some of the subject matter described herein also includes an electronic device including one or more processors; and memory storing instructions, wherein the processor is configured to execute the instructions such that the processor and memory are configured to: detect speech being spoken by a user of an assistant device; determine that the speech includes a hardware activation phrase corresponding to an intention of the user to provide at least a portion of the speech to one or both of local resources of the assistant device or a cloud server based on the hardware activation phrase; and provide the portion of the speech to one or both of the local resources or the cloud server based on the hardware activation phrase.

In some implementations, the local resources include one or both of hardware resources of the assistant device or resources of other devices connected with the assistant device on a wireless network.

In some implementations, the processor is configured to execute the instructions such that the processor and memory are configured to determining that the portion of the speech includes a first portion and a second portion, the first portion provided to the local resources, the second portion provided to the cloud server.

In some implementations, the processor is configured to execute the instructions such that the processor and memory are configured to: receiving first response data corresponding to the first portion from the local resources; receiving second response data corresponding to the second portion from the cloud server; and providing a response to the portion of the speech based on the first response data received from the local resources and the second response data received from the cloud resources.

In some implementations, the first portion and the second portion are determined based on content of the portion of the speech.

In some implementations, a first hardware activation phrase corresponds to providing the portion of the speech to the local resources, and a second hardware activation phrase corresponds to providing the portion of the speech to the cloud server, the first hardware activation phrase and the second hardware activation phrase being different.

In some implementations, the portion of the speech is subsequent to a portion of the speech corresponding to the hardware activation phrase.

Some of the subject matter described herein also includes a computer program product, comprising one or more non-transitory computer-readable media having computer program instructions stored therein, the computer program instructions being configured such that, when executed by one or more computing devices, the computer program instructions cause the one or more computing devices to: detect speech being spoken by a user of an assistant device; determine that the speech includes a hardware activation phrase corresponding to an intention of the user to provide at least a portion of the speech to one or both of local resources of the assistant device or a cloud server based on the hardware activation phrase; and provide the portion of the speech to one or both of the local resources or the cloud server based on the hardware activation phrase.

In some implementations, the local resources include one or both of hardware resources of the assistant device or resources of other devices connected with the assistant device on a wireless network.

In some implementations, the computer program instructions cause the one or more computing devices to: determine that the portion of the speech includes a first portion and a second portion, the first portion provided to the local resources, the second portion provided to the cloud server.

In some implementations, the computer program instructions cause the one or more computing devices to: receive first response data corresponding to the first portion from the local resources; receive second response data corresponding to the second portion from the cloud server; and provide a response to the portion of the speech based on the first response data received from the local resources and the second response data received from the cloud resources.

In some implementations, the first portion and the second portion are determined based on content of the portion of the speech.

In some implementations, a first hardware activation phrase corresponds to providing the portion of the speech to the local resources, and a second hardware activation phrase corresponds to providing the portion of the speech to the cloud server, the first hardware activation phrase and the second hardware activation phrase being different.

Some of the subject matter described herein also includes an electronic device, including: a microphone array; one or more speakers; one or more processors; and memory storing instructions, wherein the processor is configured to execute the instructions such that the processor and memory are configured to: detect speech being spoken by a user of an assistant device using the microphone array; determine that the speech includes a hardware activation phrase corresponding to an intention of the user to provide at least a portion of the speech to one or both of local resources of the assistant device or a cloud server based on the hardware activation phrase; and provide the portion of the speech to one or both of the local resources or the cloud server based on the hardware activation phrase; receive a response from one or both of the local resources or the cloud server; and play back audio corresponding to the response using the one or more speakers.

Some of the subject matter described herein also includes a home assistant device, including: one or more processors; and memory storing instructions, wherein the processor is configured to execute the instructions such that the processor and memory are configured to: determine that first speech includes a first hardware activation phrase indicating an intention to provide a first content of the first speech to a cloud server; provide the first content to the cloud server; receive a first response from the cloud server corresponding to the first content; determine that second speech includes a second hardware activation phrase representing an intention to provide a second content of the second speech to local resources of the home assistant device rather than the cloud server due to increased privacy expectations regarding the second content of the second speech in comparison with privacy expectations regarding first content of the first speech; provide the second content to the local resources; and receive a second response from the local resources corresponding to the second content.

Some of the subject matter described herein also includes an electronic device, including: a speaker; a microphone; one or more processors; and memory storing instructions, wherein the processor is configured to execute the instructions such that the processor and memory are configured to: detect speech spoken by a user using the microphone; determine that the speech includes a hardware activation phrase corresponding to an intention of the user to provide at least a portion of the speech to one or both of local resources of the assistant device or a cloud server based on the hardware activation phrase; provide the portion of the speech to one or both of the local resources or the cloud server based on the hardware activation phrase; receive a response to the portion of the speech from one or both of the local resources or the cloud server; and play back an audio output based on the response using the speaker.

BRIEF DESCRIPTION OF THE DRAWINGS

FIGS. 2A and 2B illustrate an example of a block diagram for an assistant device responding to voice input.

DETAILED DESCRIPTION

This disclosure describes devices and techniques for managing privacy in an environment with connected devices. In one example, a home assistant device can listen to speech asking a question in its vicinity using a microphone array and provide an audible answer to the question using a speaker. Some speech can include a hardware activation phrase in which the home assistant device can record and provide the rest of the speech subsequent to the hardware activation phrase to a server in the cloud via the Internet. The server in the cloud can then provide the answer by providing results data. A second hardware activation phrase can result in keeping the speech within the local resources of the home's connected environment, for example, the home assistant device itself can try to answer the question. For example, if the speech is "Cloud, what is today's date?" then "cloud" can be a hardware activation phrase indicating that "what is today's date?" can be provided to a cloud server. By contrast, if the speech is "Local, what is today's date?" then "local" can be a hardware activation phrase indicating that "what is today's date?" should be kept within the local resources of the home's connected environment. In this way, some speech can be kept locally within the home's connected environment rather than transmitted to a server in the cloud. This can allow some users to try to get answers to their questions that might include content that they might not want to leave their home environment due to privacy concerns.

In another example, some speech can include a portion that can be answered by the local resources of the home's connected environment and another portion that can be answered by the cloud resources. The answers from the local resources and the cloud resources can then be analyzed and/or combined to provide an answer. As a result, speech can be provided to one or both of the cloud server and local resources without the use of a hardware activation phrase.

In another example, the home assistant device can determine who is speaking to it (e.g., based on voice recognition, video recognition using a camera, etc.) and then determine the speaker's privacy expectations and then use the local resources, cloud resources, or both to provide an answer based on the determined privacy expectations. The context, content, timing, or other characteristics of the speech can be used to determine whether speech should be provided to the local resources, cloud resources, or both.

Figure 1:
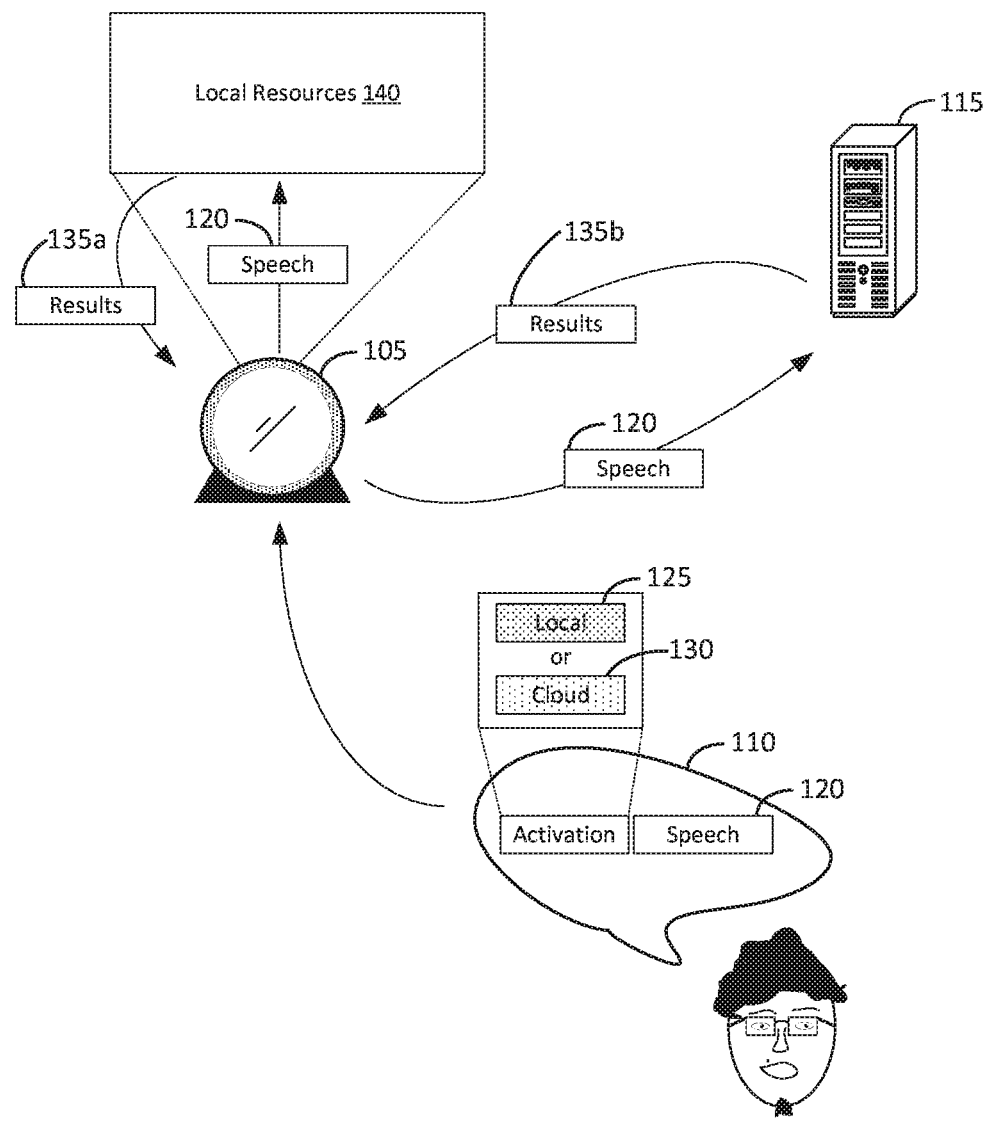
FIG. 1 illustrates an example of an assistant device responding to voice input.

In more detail, FIG. 1 illustrates an example of an assistant device responding to voice input. In FIG. 1, home assistant device 105 can include an intelligent home assistant enabled by a microphone (or microphone array) to hear speech 110 and provide a response to speech 110 using one or more speakers. For example, speech 110 can include a question and the response provided by home assistant device 105 can be an answer to that question provided in a voice output using the speakers. Accordingly, the experience using home assistant device 105 can be based on audio such as voice. However, in other implementations, the responses provided by home assistant device 105 can also be provided on a display screen, or a combination of both audio and the display screen. For example, answers to spoken questions can be textually or graphically displayed on the display screen of home assistant device 105.

In FIG. 1, based on whether the hardware activation phrase is local hardware activation phrase 125 or cloud hardware activation phrase 130, speech 120 is provided to either cloud server 115 or kept within local resources 140, for example, home assistant device 105 itself (e.g., its own hardware and software capabilities) or other devices within the home's wireless network (e.g., a tablet, laptop, etc. that home assistant device 105 is at least communicatively coupled with). Local hardware activation phrase 125 and cloud hardware activation phrase 130 can be different words or phrases of speech. For example, if cloud hardware activation phrase 130 is spoken and then speech 120 is subsequently spoken, then home assistant device 105 can determine that cloud hardware activation phrase 130 was spoken and then record speech 120 and provide speech 120 to cloud server 115. Speech 120 can include a question or other type of content in which a response from home assistant device 105 is expected or would be useful. Cloud server 115 can analyze speech 120 (e.g., either translated into text by home assistant device 105, or audio data including the speech) and provide results 135b to home assistant device 105 providing the response. Results 135b can be data such as text that home assistant device 105 can convert into speech played on its speakers, or results 135b can be the audio that should be played on the speakers. As such, speech 120 can be transmitted outside of the home's wireless network to cloud server 115 via the Internet.

By contrast, if local hardware activation phrase 125 is spoken, then speech 120 can be kept within local resources 140, which can be home assistant device 105 itself, other devices within the home's wireless network (e.g., a personal computer, laptop, tablet, smartphone, smartwatch, etc.), or a combination of home assistant device 105 and the other devices. For example, in FIG. 1, speech 120 can be provided to local resources 140 and results 135a can be provided via the speaker in a similar manner as described above with respect to results 135b.

Some users might want to keep speech 120 within local resources 140 rather than cloud server 115 because they might not want sensitive content to be transmitted over the Internet to cloud server 115 outside of the home environment. As a result, by having two different hardware activation phrases, a user can still use home assistant device 105 without fear of their privacy being violated. This can also allow for users to be more comfortable using home assistant device 105 because the user has more control over the privacy of their speech.

Figure 2B:
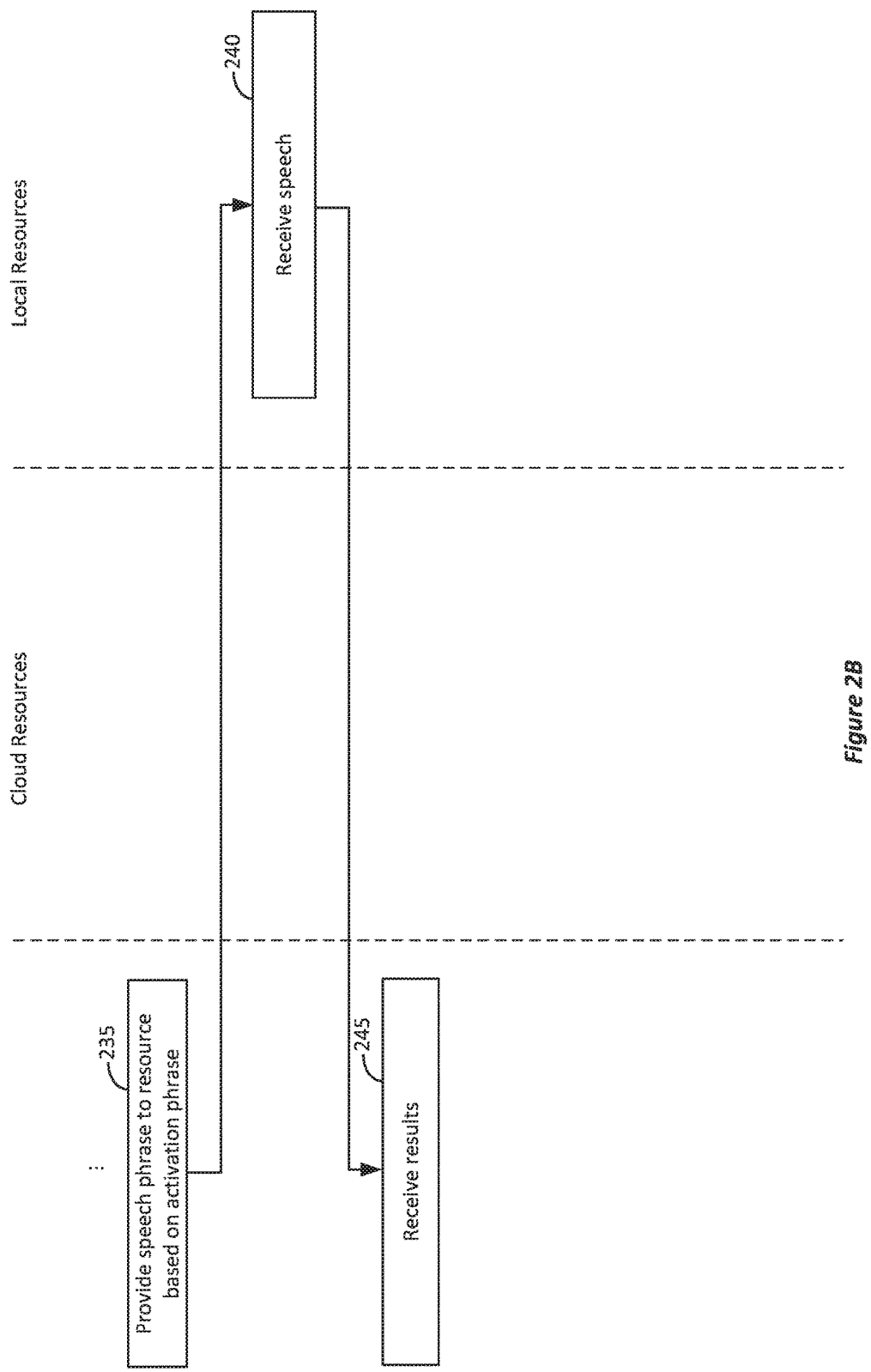

FIGS. 2A and 2B illustrate an example of a block diagram for an assistant device responding to voice input. In FIG. 2A, at block 205, a home device can receive speech. For example, in FIG. 1, home assistant device 105 can pick up speech 110 via its microphone. In some implementations, the speech can be recorded (e.g., saved in memory) for analysis by a processor of home assistant device 105. At block 210, the home device can determine which type of resource to use based on the hardware activation phrase of speech 110. For example, in FIG. 1, the hardware activation phrase can be local hardware activation phrase 125 representing an intent for the subsequent speech 120 to be contained within local resources 140 or cloud hardware activation phrase 130 representing an acceptability for the subsequent speech 120 to be provided to cloud server 115. In block 215, the speech can then be provided to the resource corresponding to the activation phrase.

If cloud hardware activation phrase 130 is spoken, then at block 220, the speech can be received by cloud server 115 and results based on that speech can be determined at block 225. For example, if speech 120 included a question, then results 135b including an answer to the question can be generated and provided to home assistant device 105 at block 230.

If local hardware activation phrase 125 is spoken, then at block 235 in FIG. 2B, the speech can be provided to local resources 140. Local resources 140 can receive speech 120 at block 240, determine results based on the speech similar to block 225, and then provide the results at block 245.

In some implementations, home assistant device 105 can include an alert indicating that speech 120 in FIG. 1 is about to be transmitted outside of the home environment to cloud server 115. For example, a light source such as a light emitting diode (LED) of home assistant device 105 can be turned on to indicate that speech 120 is about to be transmitted to cloud server 115. The user can then interact with home assistant device 105, for example, by pressing a button or using voice interaction to indicate that speech 120 should not be transmitted to cloud server 120. In some implementations, speech 120 can then be attempted to be answered within local resources 140. In some implementations, home assistant device 105 can also indicate that speech 120 will be kept within local resources 140 in a similar manner.

Home assistant device 105 can also be instructed to send speech to cloud server 120 or local resources 140 based on other types of user interactions other than providing a hardware activation phrase. For example, the user can select or touch a button or touchscreen of home assistant device 105 to indicate that speech should be kept within local resources 140. As another example, the user can select an application, or "app," on a smartphone, press a button on a remote control, press a button on a smartwatch, etc. to indicate that speech should be kept within local resources 140.

In some implementations, local hardware activation phrase 125 and cloud hardware activation phrase 130 can be set by the user. For example, local hardware activation phrase 125 can be a phrase including multiple words, a single word, a sound (e.g., whistling), etc. assigned by a user. The user assign another phrase, word, sound, etc. to cloud hardware activation phrase 130 such that they can be differentiated from each other.

Figure 3:
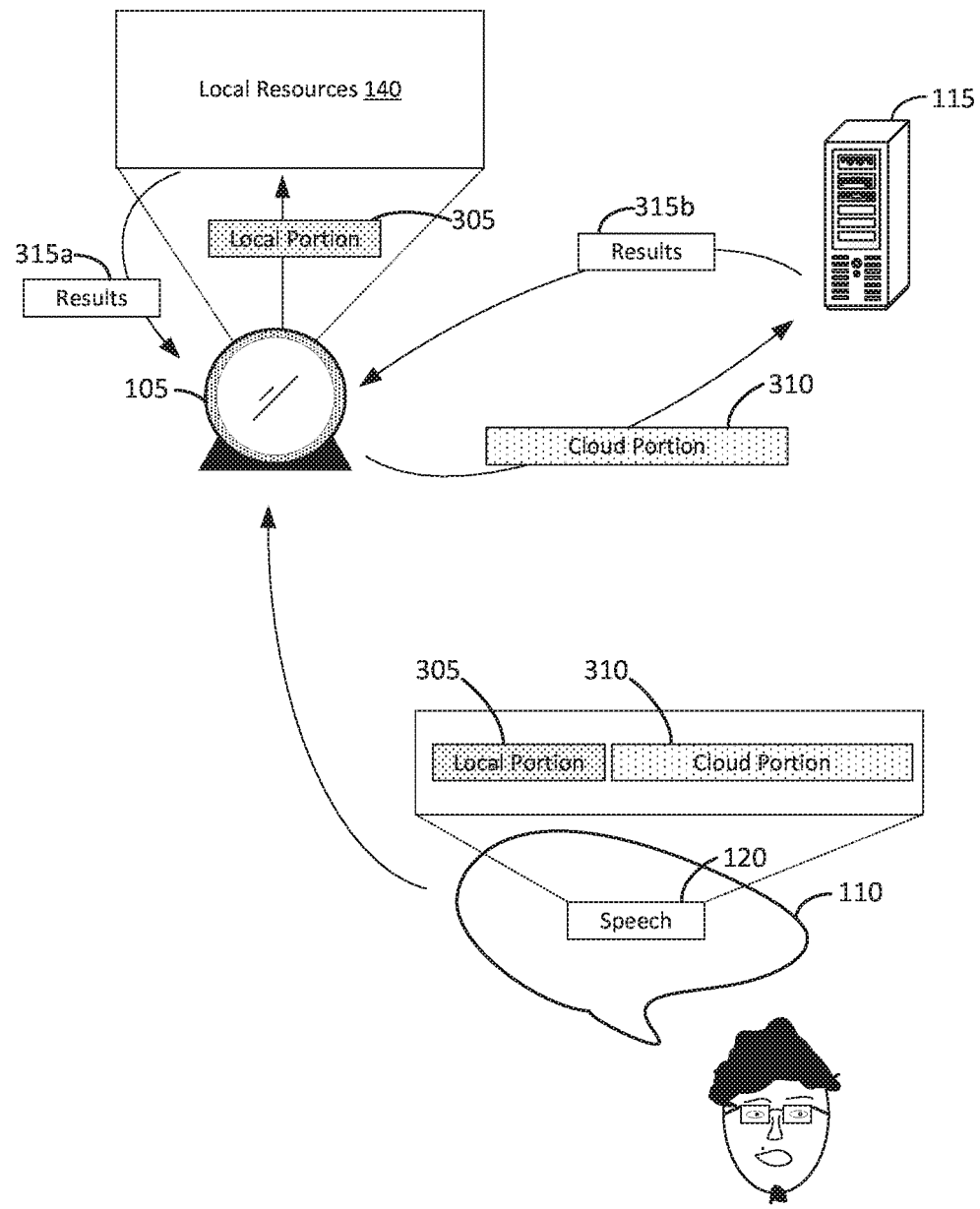
FIG. 3 illustrates an example of an assistant device using local resources and cloud resources to respond to voice input.

Portions of speech can be provided to both cloud resources and local resources. FIG. 3 illustrates an example of an assistant device using local resources and cloud resources to respond to voice input. In FIG. 3, speech 120 can be provided to home assistant device 105 and it can determine that speech 120 includes portion 305 that should be provided to local resources 140 and portion 310 that should be provided to cloud server 115. That is, speech 120 can include one portion for local resources and another portion for cloud resources even without the use of a hardware activation phrase. Home assistant device 105 can separate the two portions (e.g., based on characteristics of the portions, as discussed later herein) and provide them to the respective resources (i.e., either local resources 140 or cloud server 115). This results in results 315a and 315b provided to home assistant device 105. Home assistant device 105 can use both results 315a and 315b to provide an answer to speech 120. For example, both can be combined to provide an answer. That is, results from both local resources 140 and cloud server 115 can be used to provide a response to a user's speech. In some implementations, if there is some inconsistency with the answers provided by results 315a and 315b, then one of local resources 140 or cloud server 115 can be prioritized and the results of that one can be used for the answer or the corresponding portion of the answer.

Figure 4:
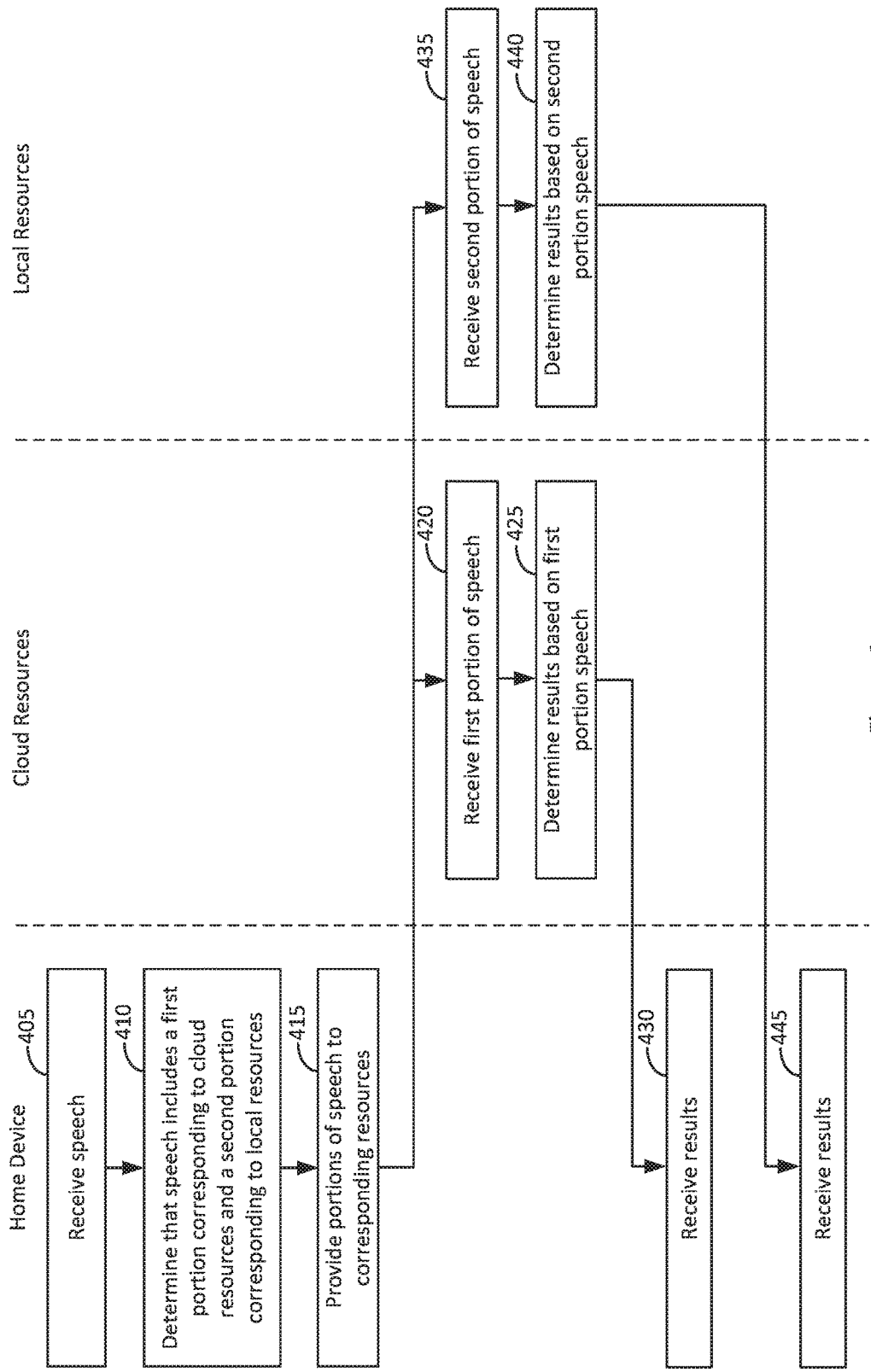
FIG. 4 illustrates an example of a block diagram for using local resources and cloud resources to respond to voice input.

FIG. 4 illustrates an example of a block diagram for using local resources and cloud resources to respond to voice input. In FIG. 4, at block 405, speech can be received. For example, in FIG. 3, speech 120 having local portion 305 and cloud portion 310 can be received. At block 410, it can be determined that the speech includes a first portion to be provided to cloud resources and a second portion to be provided to local resources. For example, in FIG. 3, cloud portion 310 should be provided to cloud server 115 and local portion 305 should be provided to local resources 140. In some implementations, the different portions of the speech can be determined based on characteristics of one or more of the portions of the speech (e.g., content, time, location, person providing the speech, etc.). For example, if a certain word has been detected, then a portion of the speech within a time period before and after that word was spoken can be identified as one of the portions (e.g., local portion 305) and the rest of the speech can be identified as the other portion (e.g., cloud portion 310). In one example, some words can be identified as being related to sensitive speech that a user might not want to be sent to cloud server 115, and therefore, if the certain word is identified as a sensitive word then local portion 305 can be identified. Thus, home assistant device 105 can include a dictionary (e.g., data in memory) of sensitive words that can be identified. At block 415, the different portions can be provided to the resources. For example, new speech data for the portions can be generated and provided to cloud server 115 and local resources 140 at blocks 420 and 435, respectively. At blocks 425 and 440, results based on the portions can be determined by the resources. The results can then be provided to the home assistant device at blocks 430 and 445. Home assistant device 105 can then use both results received from the cloud resources and local resources to provide a response. For example, both can be combined to provide an answer to a question that was asked. That is, results from both local resources 140 and cloud server 115 can be used to provide a response to a user's speech.

Regarding characteristics of the speech, home assistant device 105 can determine portions of speech 120 that are relatively sensitive and classify those portions as local portion 205 and provided to local resources 140. Portions that are not sensitive can be classified as cloud portion 210 and provided to cloud server 115. For example, home assistant device 105 can develop an understanding of a user's privacy expectations and classify speech as local portion 205 based on the user's privacy expectations. Thus, characteristics of the speech can result in different privacy expectations and those privacy expectations can be used to determine whether speech should be provided to cloud server 115 or local resources 140.

In some implementations, home assistant device 105 can determine who is speaking. For example, home assistant device 105 can use voice recognition to determine a particular user. In another example, home assistant device 105 can include a camera to visually determine who is speaking, or home assistant device 105 can access a camera connected with the home's wireless network or a personal area network (PAN) set up by either the camera or home assistant device 105. Based on the user interacting with home assistant device 105, different privacy expectations can be determined. As a result, different users can say the same speech 120, but different local portion 305 and cloud portion 310 may be identified based the privacy expectations of the user.

In some implementations, other characteristics of speech 120 can be used to determine the privacy expectations, and therefore, whether local resources 140 or cloud server 115 is to be used for speech 120 or a portion of speech 120. For example, the context (e.g., multiple people talking, whether the user appears to be incapacitated in some manner such as intoxicated, etc.) of speech 120 can be used. In another example the content of speech 120 can be used, as previously discussed. For example, if the user is identified as speaking often regarding privacy concerns, discussing topics related to privacy, etc. then the privacy expectations of that user can be increased. In another example, the time when speech 120 was received by home assistant device 105 can be used. In one example, if speech 120 was received late at night or early in the morning, then this can indicate a higher privacy expectation.

In another example, if a user's speech is quiet (e.g., the volume of the speech is determined to be within a threshold volume range or beneath a threshold volume value), then this can mean that the user expects more privacy, and therefore, the privacy expectations for that speech can be stricter, increasing the likelihood of the speech or portions of the speech being provided to local resources 140 rather than cloud server 115. If the volume of the user's speech is loud, then this can indicate that it is not a sensitive topic, and therefore, the speech can be provided to cloud server 115.

Other characteristics of the speech of the users can be determined to adjust the privacy expectations. For example, the distance of the user from home assistant device 105 can be used to determine the user's privacy expectations. If the user is close to home assistant device 105 (e.g., determined to be within a threshold distance range of home assistant device 105 using cameras or audio recognition), then this can indicate that the user has higher privacy expectations, and therefore, the speech or portions of the speech should be provided to local resources 140 rather than cloud server 115. If the user is farther away, then this might indicate that the user has lower privacy expectations.

In some implementations, the location of the speech can influence whether the speech is kept within local resources 140, cloud server 115, or both. For example, if speech is from participants in a bedroom, then it might be kept within local resources 140 due to that speech being from a more sensitive location where many people have a higher expectation of privacy. By contrast, if speech is from participants in a living room, then it can be provided to cloud server 115. Accordingly, home assistant device 105 can determine the location of speech and then determine whether that speech should be kept within local resources 140, cloud server 115, or both based on the location within the home environment.

In some implementations, home assistant device 105 can determine that a user's privacy expectations have changed. For example, home assistant device 105 can store the user's birthdays or ages, and as the user ages, the privacy expectations can become stricter (i.e., more speech is to be restricted to local resources 140 rather than allowed to be transmitted to cloud server 115). In another example, as the user ages, the privacy expectations can be more lenient (i.e., more speech is to be allowed to be transmitted to cloud server 115).

Figure 5:
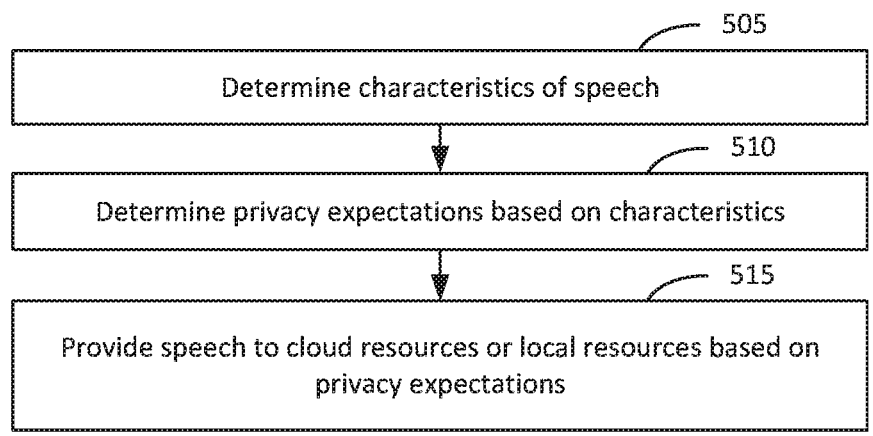
FIG. 5 illustrates an example of a block diagram of determining privacy expectations.

FIG. 5 illustrates an example of a block diagram of determining privacy expectations. In FIG. 5, at block 505, characteristics of the speech can be determined. For example, as previously discussed, the context of the speech, the volume of the speech, etc. can be used to determine various characteristics. At block 510, privacy expectations can be determined based on those characteristics. For example, if a user is speaking quietly, then higher privacy expectations can be determined than if the user is speaking loudly. At block 515, the speech can be provided to cloud resources or local resources based on the privacy expectations. For example, higher privacy expectations can result in speech being provided to local resources rather than cloud resources.

In some implementations, home assistant device 105 can be set with user preferences as to what should be provided to local resources 140 and cloud server 115. In some implementations, home assistant device 105 can learn the user's privacy expectations over time.

Many of the aforementioned examples discuss speech including a question. However, in other examples, the speech can include commands. For example, home assistant device 105 can be commanded to perform an activity, such as turn on lights, open windows, turn on a security system, etc. in a smart home environment. In some implementations, speech including commands can be provided to cloud server 115 and it can perform speech-to-text translation. It can then provide results to home assistant device 105 with what it's supposed to do. That is, it can be provided data indicating how it should be responding to the commands, for example, turn on lights. Home assistant device 105 can then act on those commands. This can allow for cloud server 115 to perform the processing to determine the content of speech, but home assistant device 105 to actually perform the commands rather than cloud server 115.

In some implementations, home assistant device 105 can process a subset of possible speech on-device, but speech outside of its capabilities can be provided to cloud server 115. For example, home assistant device 105 might be able to recognize speech for a small dictionary (e.g., four hundred words) so that it can perform common commands, such as turning on lights, adjusting a thermostat, etc. This can allow home assistant device 105 to control various devices in the home without transmitting data to cloud server 115, and therefore, it can still control devices even if the Internet connection to cloud server 115 goes down. However, more complex speech including commands can be determined to include content outside of the dictionary, and therefore, can be provided to cloud server 115 for processing.

Home assistant device 105 can also provide a response based on whether results are received from cloud resources, local resources, or both. For example, home assistant device 105 can play back audio response to speech 120 at different volumes based on where the response or a portion of the response was received from. If results 315a in FIG. 3 is received (i.e., some speech was provided to local resources), then the volume of playback of the response to speech 120 can be lower than if only results 315b (i.e., speech was provided to cloud server 115) were received. In some implementations, the response to speech 120 can be displayed on the display screen of home assistant device 105 if speech was provided to local resources. In another example, if the results are only from cloud server 115, then the response can be played back on the speaker of home assistant device 105.

In some implementations, privacy expectations can be determined using many of the aforementioned examples. An increase in privacy expectations can result in home assistant device 105 encrypting data provided to cloud server 115 more, for example, using different encryption algorithms that might take longer to encrypt and for cloud server 115 to decrypt. However, some users might find a delay acceptable if their privacy is ensured. Thus, a hierarchy of encryptions levels can provide different levels, strengths, or types of encryption based on the determined privacy expectations.

In some implementations, home assistant device 105 can include an intercom feature and a home environment can include multiple home assistant devices. The different home assistant devices can communicate with each other and other devices (e.g., speakers) using technology such as Bluetooth, local WLAN, etc. This can allow users to communicate securely within a home without having communications routed through cellular communications.

In some implementations, whether speech is provided to cloud resources or local resources can also be based on the context of an activity. For example, the activity can be understood through the context of what is being communicated. In other implementations, the context can include the time of day, past behaviors, or other variables.

Many of the aforementioned examples discuss a home environment. In other examples, the devices and techniques discussed herein can also be set up in an office, public facility, outdoors, etc.

Many of the aforementioned examples discuss speech. In other examples, noise within the environment can be used with the devices and techniques disclosed herein. For example, music, television sounds, etc. can be used. In another example, environmental sounds such as glass breaking, objects shattering, etc. can be determined and provided to one or both of the local resources or cloud server based on the techniques disclosed herein.

Figure 6:
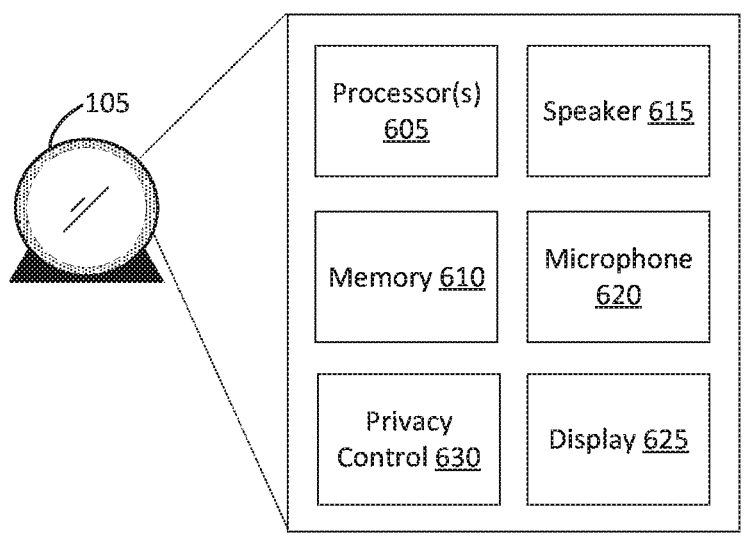
FIG. 6 illustrates an example of an assistant device.

FIG. 6 illustrates an example of an assistant device. In FIG. 6, home assistant device 105 can be an electronic device with one or more processors 605 (e.g., circuits) and memory 610 for storing instructions that can be executed by processors 605 to implement privacy control 630 providing the techniques described herein. Home assistant device 105 can also include microphone 620 (e.g., one or more microphones that can implement a microphone array) to convert sounds into electrical signals, and therefore, speech into data that can be processed using processors 605 and stored in memory 610. Speaker 615 can be used to provide audio output. Additionally, display 625 can display a graphical user interface (GUI) implemented by processors 605 and memory 610 to provide visual feedback. Memory 610 can be a non-transitory computer-readable storage media. Home assistant device 105 can also include various other hardware, such as cameras, antennas, etc. to implement the techniques disclosed herein. Thus, the examples described herein can be implemented with programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more application specific integrated circuits (ASICs), complex programmable logic devices (CPLDs), field programmable gate arrays (FPGAs), structured ASICs, etc.

Those skilled in the art will appreciate that the logic and process steps illustrated in the various flow diagrams discussed herein may be altered in a variety of ways. For example, the order of the logic may be rearranged, sub-steps may be performed in parallel, illustrated logic may be omitted, other logic may be included, etc. One will recognize that certain steps may be consolidated into a single step and that actions represented by a single step may be alternatively represented by a collection of substeps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed, scrambled and/or encrypted; etc.

From the foregoing, it will be appreciated that specific embodiments of the invention have been described herein for purposes of illustration, but that various modifications can be made without deviating from the scope of the invention. Accordingly, the invention is not limited except as by the appended claims.

We claim:

1. A home assistant device, comprising:
   a microphone;
   a speaker;
   one or more processors; and
   memory storing instructions, wherein the processor is configured to execute the instructions such that the processor and memory are configured to:
   detect first speech including a first question spoken by a user of the home assistant device using the microphone;
   determine that the first speech includes a first hardware activation phrase preceding the first question, wherein the first hardware activation phrase indicates an intention of the user to provide the first question of the first speech to a cloud server;
   provide the first question to the cloud server;
   receive a first response from the cloud server providing a first answer to the first question;
   play back the first answer using the speaker, the playback of the first answer having first characteristics;
   detect second speech including a second question spoken by the user of the home assistant device using the microphone;
   determine that the second speech includes a second hardware activation phrase preceding the second question, the first hardware activation phrase and the second hardware activation phrase being different phrases, wherein the second hardware activation phrase indicates an intention of the user to provide the second question of the second speech to local resources of the home assistant device rather than the cloud server due to increased privacy expectations regarding content of the second question in comparison with privacy expectations regarding content of the first question;
   provide the second question to the local resources of the home assistant device;
   receive a second response from the local resources providing a second answer to the second question; and
   play back the second answer using the speaker, the playback of the second answer having second characteristics that are different than the first characteristics of the playback of the first answer due to the first response being received from the cloud server rather than the local resources.

2. The home assistant device of claim 1, wherein the local resources include one or both of hardware resources of the home assistant device or resources of other devices communicatively coupled with the home assistant device on a wireless network.

3. A method for privacy control in a connected environment, comprising:
   detecting speech spoken by a user of an assistant device;
   determining, by a processor, that the speech includes a hardware activation phrase corresponding to an intention of the user to provide a first portion of the speech to one or both of local resources of the assistant device or a cloud server based on the hardware activation phrase;
providing the first portion of the speech to the local resources or the cloud server based on the hardware activation phrase;
receiving a first response data providing an answer to the first portion of the speech from the local resources;
playing back the first response data, characteristics of the playback of the first response data based on the first response data being received from the local resources;
providing a second portion of the speech to the cloud server;
receiving a second response data providing an answer to the second portion of the speech from the cloud server; and
playing back the second response data, characteristics of the playback of the second response data being different than the characteristics of the playback of the first response data due to the second portion of the speech being received from the cloud server rather than the local resources.

4. The method of claim 3, wherein the local resources include one or both of hardware resources of the assistant device or resources of other devices connected with the assistant device on a wireless network.

5. The method of claim 3, further comprising:
determining that the speech includes the first portion and the second portion, the first portion provided to the local resources, the second portion provided to the cloud server.

6. The method of claim 5, further comprising:
providing a response to the speech based on the first response data received from the local resources and the second response data received from the cloud resources.

7. The method of claim 5, wherein the first portion and the second portion are determined based on content of the speech.

8. The method of claim 3, wherein the first hardware activation phrase corresponds to providing the first portion of the speech to the local resources, and a second hardware activation phrase corresponds to providing the second portion of the speech to the cloud server, the first hardware activation phrase and the second hardware activation phrase being different.

9. The method of claim 3, wherein the first portion and the second portion are determined based on characteristics of the the speech.

10. An electronic device, comprising:
one or more processors; and
memory storing instructions, wherein the processor is configured to execute the instructions such that the processor and memory are configured to:
detect speech being spoken by a user of an assistant device;
determine that the speech includes a hardware activation phrase corresponding to an intention of the user to provide a first portion of the speech to one or both of local resources of the assistant device or a cloud server based on the hardware activation phrase;
provide the first portion of the speech to the local resources or the cloud server based on the hardware activation phrase;
receive a first response data providing an answer to the first portion of the speech from the local resources;
play back the first response data, characteristics of the playback of the first response data based on the first response data being received from the local resources;
provide a second portion of the speech to the cloud server;
receive a second response data providing an answer to the second portion of the speech from the cloud server; and
play back the second response data, characteristics of the playback of the second response data being different than the characteristics of the playback of the first response data due to the second portion of the speech being received from the cloud server rather than the local resources.

11. The electronic device of claim 10, wherein the local resources include one or both of hardware resources of the assistant device or resources of other devices connected with the assistant device on a wireless network.

12. The electronic device of claim 10, wherein the processor is configured to execute the instructions such that the processor and memory are configured to:
determine that the speech includes the first portion and the second portion, the first portion provided to the local resources, the second portion provided to the cloud server.

13. The electronic device of claim 12, wherein the processor is configured to execute the instructions such that the processor and memory are configured to:
provide a response to the portion of the speech based on the first response data received from the local resources and the second response data received from the cloud resources.

14. The electronic device of claim 12, wherein the first portion and the second portion are determined based on content of the speech.

15. The electronic device of claim 10, wherein the first hardware activation phrase corresponds to providing the first portion of the speech to the local resources, and a second hardware activation phrase corresponds to providing the second portion of the speech to the cloud server, the first hardware activation phrase and the second hardware activation phrase being different.

16. The electronic device of claim 10, wherein the first portion and the second portion are determined based on characteristics of the speech.

17. A computer program product, comprising one or more non-transitory computer-readable media having computer program instructions stored therein, the computer program instructions being configured such that, when executed by one or more computing devices, the computer program instructions cause the one or more computing devices to:
detect speech being spoken by a user of an assistant device;
determine that the speech includes a hardware activation phrase corresponding to an intention of the user to provide a first portion of the speech to one or both of local resources of the assistant device or a cloud server based on the hardware activation phrase;
provide the first portion of the speech to the local resources or the cloud server based on the hardware activation phrase;
receive a first response data providing an answer to the first portion of the speech from the local resources;
play back the first response data, characteristics of the playback of the first response data based on the first response data being received from the local resources;
provide a second portion of the speech to the cloud server;
receive a second response data providing an answer to the second portion of the speech from the cloud server; and play back the second response data, characteristics of the playback of the second response data being different than the characteristics of the playback of the first response data due to the second portion of the speech being received from the cloud server rather than the local resources.

18. The computer program product of claim 17, wherein the local resources include one or both of hardware resources of the assistant device or resources of other devices connected with the assistant device on a wireless network.

19. The computer program product of claim 17, wherein the computer program instructions cause the one or more computing devices to:
   determine that the portion of the speech includes the first portion and the second portion, the first portion provided to the local resources, the second portion provided to the cloud server.

20. The computer program product of claim 19, wherein the computer program instructions cause the one or more computing devices to:
   provide a response to the portion of the speech based on the first response data received from the local resources and the second response data received from the cloud resources.

21. The computer program product of claim 19, wherein the first portion and the second portion are determined based on content of the speech.

22. The computer program product of claim 17, wherein the first hardware activation phrase corresponds to providing the first portion of the speech to the local resources, and a second hardware activation phrase corresponds to providing the second portion of the speech to the cloud server, the first hardware activation phrase and the second hardware activation phrase being different.

* * * * *